United States Patent
Takahashi et al.

(10) Patent No.: US 6,736,449 B2
(45) Date of Patent: May 18, 2004

(54) FRONT STRUCTURE FOR A VEHICLE

(75) Inventors: Toshiyuki Takahashi, Kanagawa (JP);
Yasushi Murakami, Kanagawa (JP);
Toshiyuki Asai, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/206,033

(22) Filed: Jul. 29, 2002

(65) Prior Publication Data

US 2003/0025359 A1 Feb. 6, 2003

(30) Foreign Application Priority Data

Jul. 31, 2001 (JP) .................. 2001-232462
Nov. 22, 2001 (JP) .................. 2001-357698

(51) Int. Cl.[7] ............................... B60R 27/00
(52) U.S. Cl. .................................. 296/203.02
(58) Field of Search .............. 296/203.02, 193.09, 296/204, 187.09, 188, 189, 194, 196; 236/143, 146; 293/146; 280/781

(56) References Cited

U.S. PATENT DOCUMENTS 5,597,198 A * 1/1997 Takanishi et al. ...... 296/203.02
6,099,039 A * 8/2000 Hine ........................ 280/781
6,447,049 B1 * 9/2002 Tohda et al. ............. 296/180.1
2002/0074788 A1 * 6/2002 Fujimoto ................... 280/781

FOREIGN PATENT DOCUMENTS

| DE | 197 03 951 | 8/1997 |
|---|---|---|
| EP | 0 926 048 | 6/1999 |
| JP | 8-40313 | 2/1996 |
| JP | 9-99867 | 4/1997 |

* cited by examiner

Primary Examiner—Lori L. Coletta
(74) Attorney, Agent, or Firm—McDermott, Will & Emery

(57) ABSTRACT

A vehicle front structure including a pair of front side members extending in a fore-and-aft direction of the vehicle, each including a first front end portion with a first leading end, and a pair of subframes extending along the front side members on a lower side thereof, each including a second front end portion with a second leading end. The first and second front end portions are connected with each other via a connecting portion therebetween. An abutment member in the form of a tie-down hook or a first cross member is connected with the subframes via the connecting portion. The abutment member includes a front end forward offset from the first and second leading ends of the front side members and the subframes and a portion placed at substantially same height as the second front end portion.

17 Claims, 10 Drawing Sheets

FRONT STRUCTURE FOR A VEHICLE

BACKGROUND OF THE INVENTION

The present invention relates to a front structure for a vehicle.

A front structure for a vehicle such as an automobile, of a related art is shown in FIGS. 6 and 7. FIG. 6 illustrates front side member 1 extending in a fore-and-aft direction of the vehicle as indicated by arrow 2, in which only one of a pair of front side members 1 is illustrated. Bumper member 3 extending in a lateral direction perpendicular to fore-and-aft direction 2 is connected with front ends of front side members 1. Subframe 4 extends below each of front side members 1 in fore-and-aft direction 2. Subframe 4 is connected at least at a front end portion thereof with a front end portion of front side member 1 via bracket 5. Bumper member 3 includes bumper stay 6, bumper armature 7 mounted to a front side of bumper stay 6, and a bumper fascia covering a front side of bumper armature 7. Bumper stay 6 is deformable to absorb an impact load which is applied thereto from the front side of the vehicle. The bumper fascia is made of resin and forms a front end surface of bumper member 3. Tie-down hook 8 for holding a tow rope is disposed on the front end portion of front side member 1. Specifically, tie-down hook 8 is positioned forward bracket 5 and rearward the front end of front side member 1 and the front outer surface of bumper member 3. Tie-down hook 8 is secured to the front end portion of front side member 1 by means of bolts 9 as shown in FIG. 7.

Japanese Patent Application First Publication No. 9-99867 discloses an automotive front structure including a pair of front side members extending in a fore-and-aft direction of the vehicle on left and right sides of the front compartment. Subframes are disposed below the front side members and support automotive units such as a power unit and a suspension unit. A front bulkhead as a first cross member extending in a lateral direction of the vehicle perpendicular to the fore-and-aft direction is connected at left and right ends thereof with lower surfaces of front end portions of the front side members. Front end portions of the subframes are located rearward the left and right ends of the first cross member and connected with the lower surfaces of the front side members via brackets. A bumper mounting member as a second cross member extending in the lateral direction of the vehicle is fixed to front ends of the front side members. The bumper mounting bracket is used for mounting a bumper member.

If an impact load is applied from the front side of the vehicle to such a front structure as described in the related arts, the impact load will be transmitted to the front side members in the longitudinal direction of the vehicle via the bumper member so that the front side members may be deformed into a corrugated state to thereby absorb the impact energy.

SUMMARY OF THE INVENTION

However, the impact load acting on the front end portion of the front side members will be downward offset and transmitted to the subframes via the brackets. This will deteriorate the efficiency of transmission of the impact load. Further, in these related arts, the front ends of the subframes are located rearward offset from the front ends of the front side members. This will cause delay in rise-up of a collapse reaction force in the subframes as compared to that of the front side members, which deteriorates the efficiency of absorption of the impact energy. Further, in the related art of FIGS. 6 and 7, no cross member extending in the lateral direction of the vehicle is provided in the vicinity of a connecting portion between the front end portion of the subframe and the front side member. Therefore, many reinforcements must be used in the front side member in order to enhance the rigidity of the connecting portion. Furthermore, in the related art described in the above Japanese Patent Application First Publication No. 9-99867, the bumper member is located forward the first cross member which defines a front end of a power unit installation room in a front compartment of the vehicle. The front compartment, therefore, overhangs forward to a considerable extent. This will adversely affect freedom of design of the vehicle front compartment.

It would threrefore be desirable to provide a vehicle front structure capable of effectively dispersing an impact load which is applied from the front side of the vehicle to front side members, to subframes, and capable of improving rigidity of a connecting portion between the front side members and front end portions of the subframes. This can serve for omitting reinforcements from the front side members. Further, it would be desirable to provide a vehicle front structure in which the front side members and the subframes can absorb the impact energy from an initial stage of application of the impact load to the vehicle front structure. This can serve for enhancing the efficiency of absorption of the impact energy at the vehicle front structure.

In one aspect of the present invention, there is provided a front structure for a vehicle, the structure comprising:

a pair of front side members extending in a fore-and-aft direction of the vehicle and including a first front end portion;

a pair of subframes extending along the front side members on a lower side thereof, said pair of subframes each including a second front end portion connected with said first front end portion at a connecting portion therebetween; and a tie-down hook disposed on the connecting portion between said first front end portion and said second front end portion, said tie-down hook including a lower portion positioned at substantially same height as said second front end portion.

In a further aspect of the present invention, there is provided a front structure for a vehicle, the structure comprising:

a pair of front side members extending in a fore-and-aft direction of the vehicle, said pair of front side members each including a first front end portion with a first leading end;

a pair of subframes extending along the front side members on a lower side thereof, said pair of subframes each including a second front end portion with a second leading end, which is connected with said first front end portion; and a first cross member extending in a lateral direction extending perpendicular to the fore-and-aft direction of the vehicle, said first cross member being connected with said first front end portion, said first cross member being placed in substantially same height as said second front end portion, said first cross member including a front end, wherein said second leading end is substantially aligned with said first leading end in the fore-and-aft direction of the vehicle, and said front end of the first cross member is located forward offset from said first leading end.

In a still further aspect of the present invention, there is provided a front structure for a vehicle, the structure comprising:

a pair of front side members extending in a fore-and-aft direction of the vehicle, said pair of front side members each including a first front end portion with a first leading end;

a pair of subframes extending along the front side members on a lower side thereof, said pair of subframes each including a second front end portion with a second leading end, said second front end portion being connected with said first front end portion via a connecting portion therebetween; and an abutment member connected with the subframes via the connecting portion between said first and second front end portions, said abutment member including a front end forward offset from said first and second leading ends, and a portion placed at substantially same height as said second front end portion.

DETAILED DESCRIPTION OF THE PREFERRED EMBODIMENT

Referring now to FIGS. 1–5, there is shown a front structure for a vehicle, according to a first embodiment of the present invention. The front structure includes a pair of front side members 11 as a longitudinal body frame members extending in fore-and-aft direction of the vehicle. Front side members 11 are disposed on left and right sides of a front portion of the vehicle. For simple illustration, FIGS. 1–5 show the left front side member 11 solely.

Figure 1:
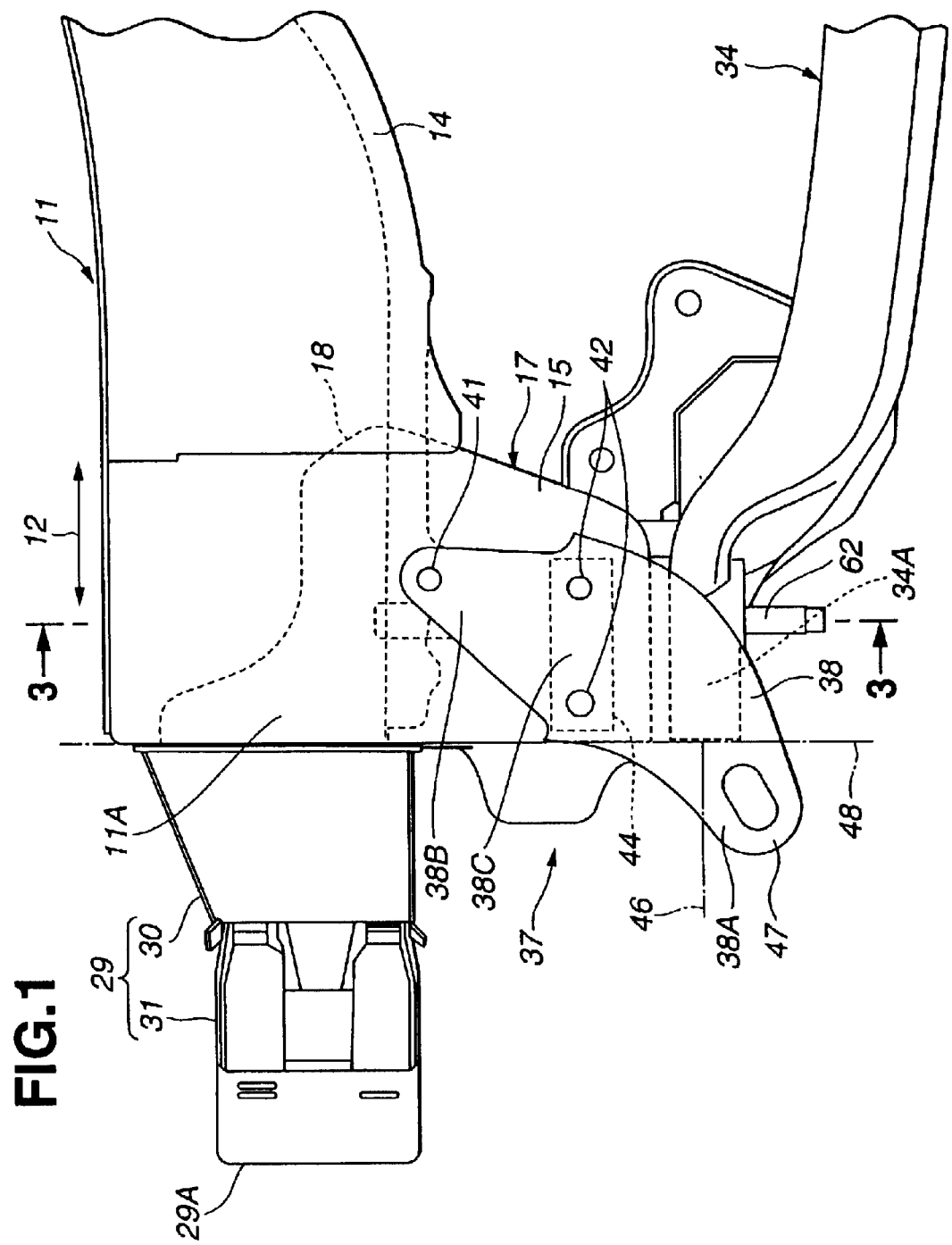
FIG. 1 is a side view of a vehicle front structure according to a first embodiment of the present invention.

As illustrated in FIG. 1, front side member 11 extends in fore-and-aft direction 12 of the vehicle and has front end portion 11A. Bumper member 29 extending in a lateral direction substantially perpendicular to fore-and-aft direction 12 of the vehicle is connected with front end portions 11A of front side member 11 via front closing plate 26 shown in FIG. 2. Bumper member 29 includes bumper stay 30 mounted to front end portions 11A of left and right front side members 11 and bumper armature 31 mounted to front ends of bumper stay 30. Bumper stay 30 is secured to front end portions 11A by a suitable fastening member such as bolts. Bumper stay 30 adapted to be deformed and absorb an impact energy produced upon an impact load being applied thereto from the front side of the vehicle. A front end of bumper armature 31 is covered with a bumper fascia made of resin and defines front end 29A of bumper member 29.

Figure 5:
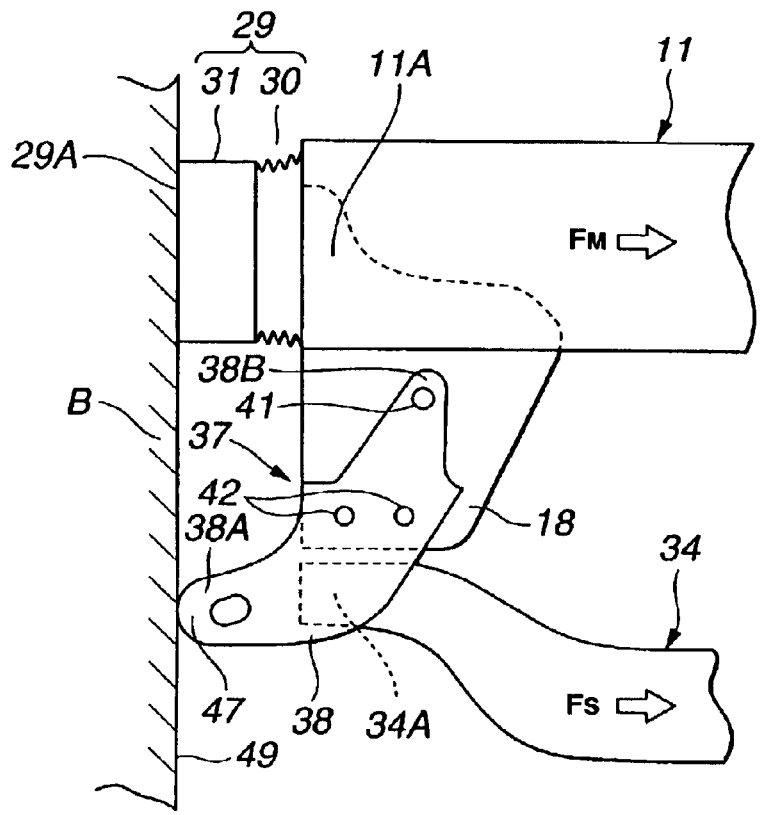
FIG. 5 is a view similar to FIG. 4, but showing the front structure of the first embodiment at a second stage of undergoing the impact load.
Figure 6:
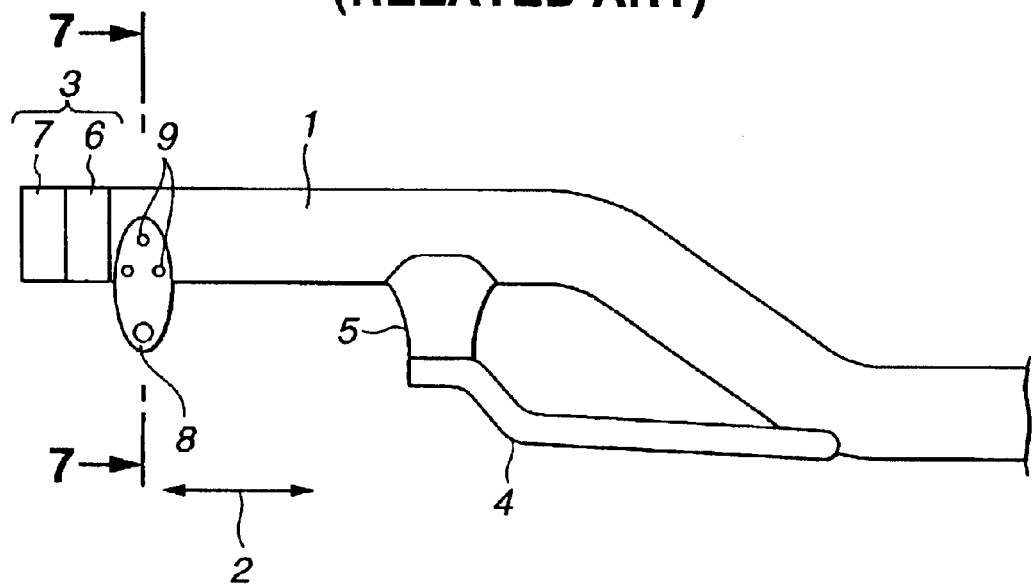
FIG. 6 is a schematic side view of a vehicle front structure of the related art.
Figure 7:
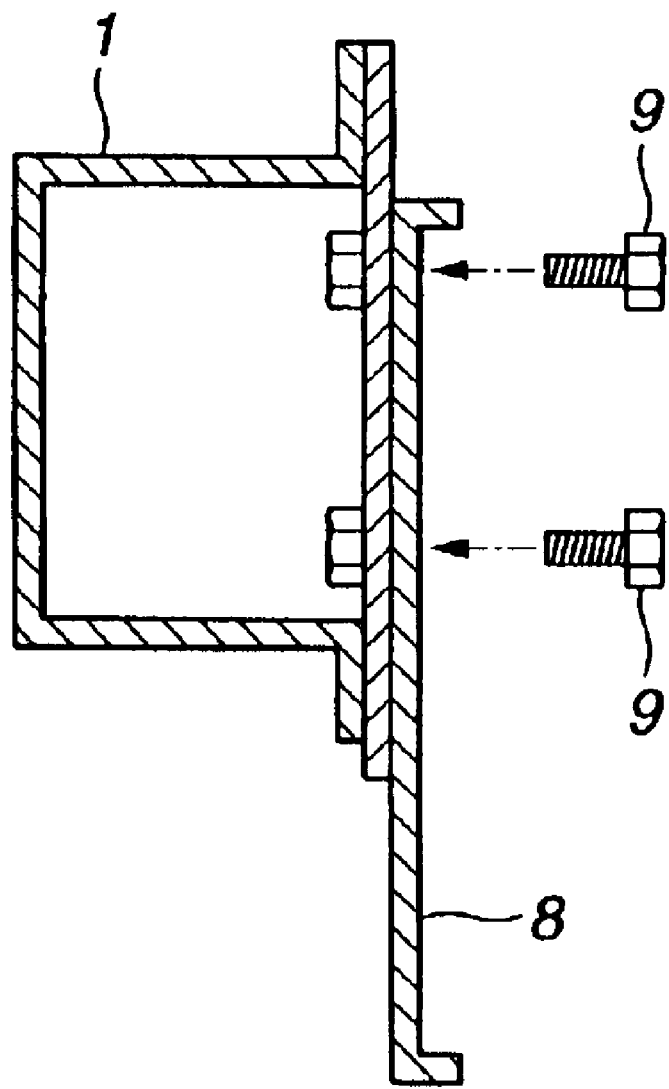
FIG. 7 is a cross-section taken along line 7—7 of FIG. 6.

A pair of subframes 34 extend below and along front side member 11, namely, in fore-and-aft direction 12. Each of subframes 34 includes front end portion 34A connected with front end portion 11A of front side member 11. Reference numeral 37 denotes a connecting portion between front end portion 11A of front side member 11 and front end portion 34A of subframe 34. Tie-down hook 38 for holding a tow rope is disposed on connecting portion 37 between front end portion 11A of front side member 11 and front end portion 34A of subframe 34. Tie-down hook 38 includes lower portion 38A formed with forward projection 47. Lower portion 38A is positioned at substantially same height as front end portion 34A of subframe 34. The height is indicated by reference numeral 46 in FIG. 1. Forward projection 47 is located in such a position forward offset from a position indicated by reference numeral 48 in FIG. 1, i.e., from a leading end of front end portion 11A of front side member 11. Forward projection 47 is also rearward offset from front end 29A of bumper member 29. Forward projection 47 is designed such that the tip end is substantially aligned with front end 29A of bumper member 29 in fore-and-aft direction 12 of the vehicle as shown in FIG. 5 when bumper member 29 is deformed due to the impact load applied thereto from the front side of the vehicle. Tie-down hook 38 also includes upper portion 38B fixedly connected with front end portion 11A of front side member 11 via side closing plate 15 by means of bolt 41. Upper portion 38B is located in a rearward position rearward offset from the leading end of front end portion 11A. Tie-down hook 38 includes intermediate portion 38C between lower portion 38A and upper portion 38B which is fixedly connected with side closing plate 15 by means of bolts 42.

Figure 2:
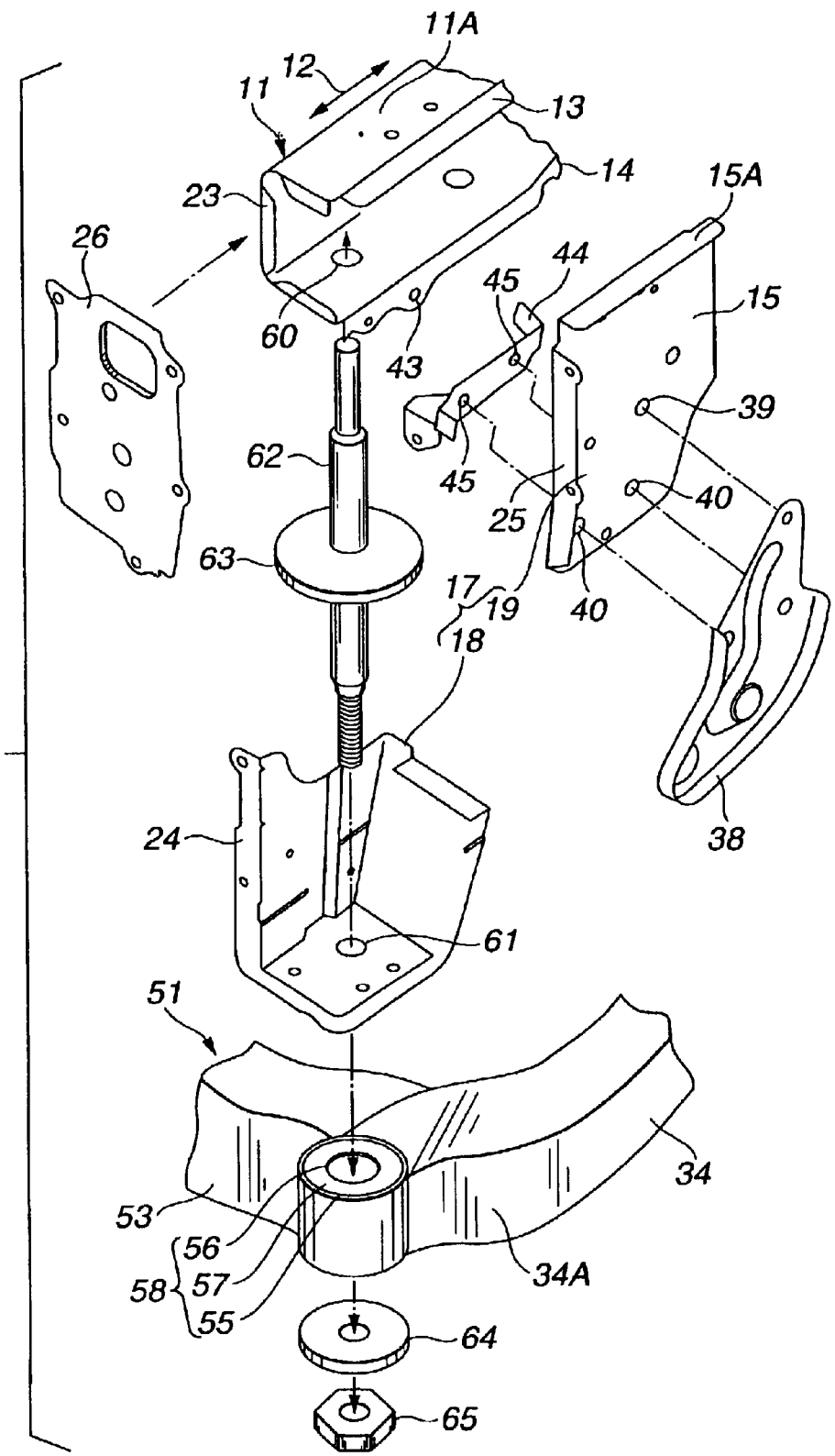
FIG. 2 is an exploded perspective view of FIG. 1.

Specifically, as illustrated in FIG. 2, front side member 11 has a generally C-shaped view which has an open side opened to the outside. Closing plate 15 is joined with front side member 11 to form a closed section at at least front end portion 11A of front side member 11. Closing plate 15 is connected with front side member 11 by fixing upper flange 15A and middle portion 15B shown in FIG. 3, to upper flange 13 and lower flange 14 of front side member 11, respectively, in a suitable manner such as welding. Front side member 11 has downward bulge 17 at front end portion 11A. Downward bulge 17 is formed by front suspension mounting bracket 18 and downward extension 19 of closing plate 15. Front suspension mounting bracket 18 having a generally L-shape in front view is joined with front end portion 11A of front side member 11 in a partially overlapping state. Downward extension 19 of closing plate 15 is connected with one open side of L-shaped front suspension mounting bracket 18. Front closing plate 26 is joined with front end portion 11A and downward extension 17 of front side member 11. Front closing plate 26 is fixed at a rear side thereof to flange 23 of front end portion 11A, flange 24 of mounting bracket 18 and flange 25 of side closing plate 15 in a suitable manner such as welding. Bumper stay 30 shown in FIG. 1 is mounted to a front face of front closing plate 26 by means of fastening members such as bolts.

Upper portion 38B of tie-down hook 38 is fixed to lower flange 14 of front side member 11 via side closing plate 15 by bolt 41 shown in FIG. 1. Lower flange 14 and side closing plate 15 are formed with mount holes 43 and 39 as shown in FIG. 2, which are in alignment with each other to receive bolt 41. Backing plate 44 is fixed to an inside surface of side closing plate 15 in a suitable manner such as welding. Backing plate 44 has mount holes 45 aligned with mount holes 40 of side closing plate 15. Mount holes 45 and 40 receive bolts 42, shown in FIG. 1, for fixing intermediate portion 38C of tie-down hook 38 to side closing plate 15. Meanwhile, tie-down hook 38 may be directly connected with subframe 34.

Front suspension 51 shown in FIG. 2 is disposed at connecting portion 37, shown in FIG. 1, between front end portion 11A of front side member 11 and front end portion 34A of subframe 34. As illustrated in FIG. 2, front suspension 51 includes cross member 53 joined with front end portion 34A of subframe 34, and bushing 58 disposed at the connection of front end portion 34A of subframe 34 and an end portion of cross member 53. FIG. 2 shows only the vicinity of the left joint portion of front end portions 34A of left subframe 34 and the left-side end portion of cross member 53. Namely, cross member 53 extends in a lateral direction substantially perpendicular to fore-and-aft direction 12 and has the opposed end portions joined with front end portions 34A of left and right subframes 34. Bushing 58 includes outer and inner cylindrical members 55 and 56 made of metal and annular-shaped elastomeric member 57 which is disposed between outer and inner cylindrical members 55 and 56 and made of elastomeric material such as rubber.

Figure 3:
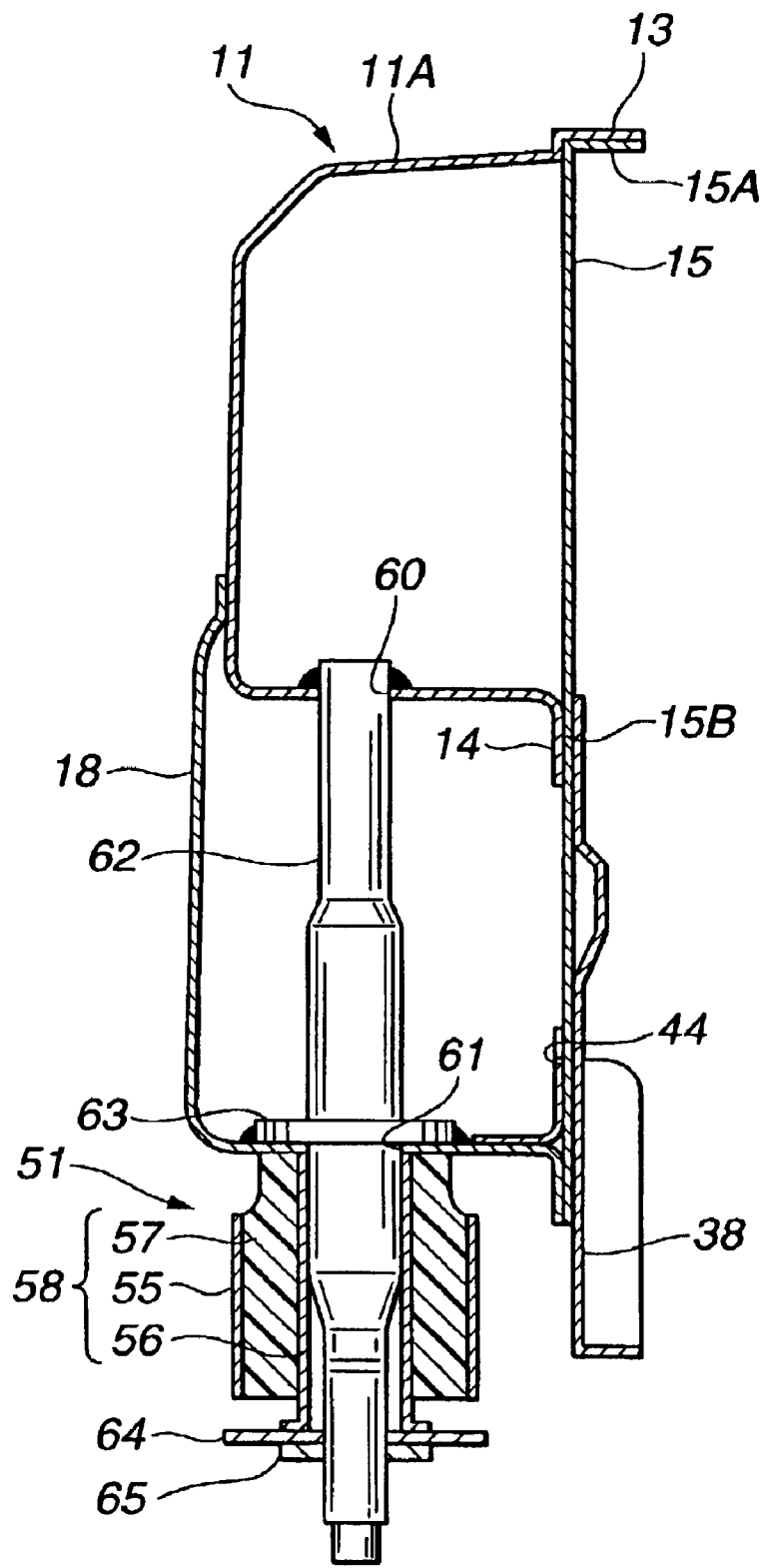
FIG. 3 is a cross-section taken along line 3—3 of FIG. 1.

Front suspension 51 is connected to front end portion 11A of front side member 11 via front suspension mounting bracket 18 as a front suspension mounting portion and front suspension mounting bolt 62 extending through bracket 18. Front end portion 11A of front side member 11 has mount hole 60 formed in a bottom wall thereof. Front suspension mounting bracket 18 has mount hole 61 which is formed in a bottom wall thereof in alignment with mount hole 60. As illustrated in FIG. 3, front suspension mounting bolt 62 is inserted into bracket 18 and front end portion 11A through mount holes 60 and 61. An upper half of bolt 62 is fixed to the respective bottom walls of front end portion 11A and bracket 18 by welding. Front suspension mounting bolt 62 has flange 63 on a mid-portion thereof. Flange 63 has a lower surface contacted with an upper surface of the bottom wall of bracket 18 so that flange 63 is supported by the bottom wall of bracket 18. Inner cylindrical member 56 of bushing 58 is mounted onto a lower half of front suspension mounting bolt 62 projected downward from the bottom wall of bracket 18. Inner cylindrical member 56 is retained by stop 64 and nut 65 disposed at a lower end thereof and prevented from removal from front suspension mounting bolt 62. Front suspension mounting bolt 62 is located at front end portion 11A of front side member 11 adjacent to tie-down hook 38 in a laterally spaced relation thereto.

Figure 4:
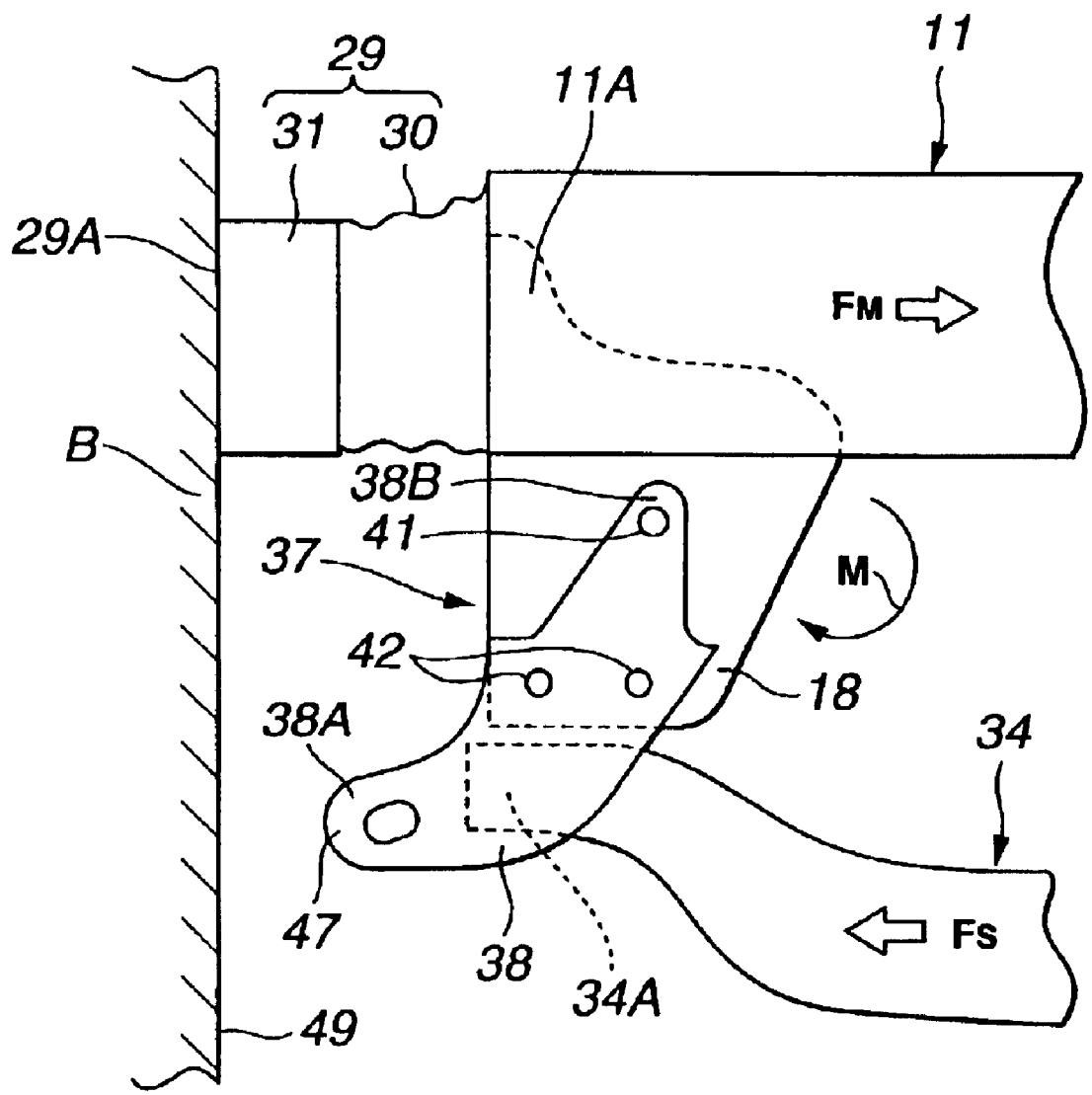
FIG. 4 is a side view of the front structure in a fore-and-aft direction of the vehicle, showing the front structure of the first embodiment which undergoes an impact load from the front side of the vehicle at a first stage.

Referring now to FIGS. 4 and 5, an operation of the vehicle front structure upon application of an impact load thereto from the front side of the vehicle is explained. FIGS. 4 and 5 show a first deformation condition of the front structure upon applying a relatively small impact load thereto and a second deformation condition thereof upon applying an impact load more than the relatively small impact load thereto, respectively. As illustrated in FIG. 4, upon relatively light abutment of the front portion of the vehicle on counterpart B, the relatively small impact load is applied to front end 29A of bumper member 29. Impact force FM is rearward transmitted to front end portion 11A of front side member 11. Bumper stay 30 of bumper member 29 is deformed into a corrugated state due to the impact load. In this condition, tie-down hook 38 is out of contact with counterpart B because forward projection 47 of lower portion 38A of tie-down hook 38 is located rearward offset from front end 29A of bumper member 29. Further, rotation moment M as shown in FIG. 4 is produced at front end portion 11A because upper portion 38B of tie-down hook 38 is connected with front end portion 11A of front side member 11 and located rearward offset from the leading end of front end portion 11A. Rotation moment M is forward transmitted to front end portion 34A of subframe 34 via connecting portion 37 between front end portions 11A and 34A, causing force Fs in subframe 34 as shown in FIG. 4. The impact load applied to bumper member 29 thus can be shared by front side member 11 and subframe 34.

In the second deformation condition as shown in FIG. 5, bumper stay 30 of bumper member 29 is collapsed and deformed into the more corrugated state by the impact load applied to front end 29A of bumper member 29. When the bumper stay 30 is brought into the more corrugated state, the tip end of forward projection 47 of lower portion 38A of tie-down hook 38 abuts on counterpart B to be in contact with counterpart B so that tie-down hook 38 can directly transmit impact force $F_s$ to subframe 34. Thus, the impact load applied to bumper member 29 can be shared by front side member 11 and subframe 34. Subsequently, the front side member 11 and subframe 34 will be deformed, so that the impact energy can be effectively absorbed.

With the above-described arrangement of tie-down hook 38 relative to front side member 11 and subframe 34, the impact load applied to bumper member 29 can be shared by front side member 11 and subframe 34 from relatively early stage of application of the impact load. That is, lower portion 38A with forward projection 47 is located at substantially same height, indicated at 46 in FIG. 1, as front end portion 34A of subframe 34. Further, forward projection 47 of tie-down hook 38 is located forward offset from front end portions 11A and 34A of front side member 11 and subframe 34 and rearward offset from front end 29A of bumper member 29.

Further, in the above-described arrangement of the front structure, tie-down hook 38 is arranged such that the tip end of forward projection 47 of tie-down hook 38 is substantially aligned with front end 29A of bumper member 29 in the second deformation condition shown in FIG. 5. Tie-down hook 38, therefore, can be free from contact with counterpart B until bumper member 29 comes into the deformed state shown in FIG. 5, and can be in contact with counterpart B immediately upon bumper member 29 being allowed in the deformed state of FIG. 5. The impact energy thus can be effectively absorbed in stages. Further, the arrangement can serve for preventing front side member 11 and subframe 34 from undergoing deformation in a case where such a relatively small impact load as in the first deformation condition is applied to bumper member 29.

Further, since front suspension 51 is arranged at connecting portion 37 between front end portion 11A of front side member 11 and front end portion 34A of subframe 34, rigidity of the mounting structure of front suspension 51 can be increased. As a result, driving stability of the vehicle can be improved.

Further, tie-down hook 38 and front suspension mounting bolt 62 are arranged at front end portion 11A of front side member 11 in the laterally spaced relation to each other. This can enhance rigidity of front side member 11 without using specific reinforcing members. This also can reduce the number of reinforcing members used in the front side member as compared with the conventional front structure.

Furthermore, since forward projection 47 of lower portion 38A of tie-down hook 38 is located rearward offset from front end 29A of bumper member 29, forward projection 47 will not adversely influence freedom of design of the vehicle front compartment.

Figure 8:
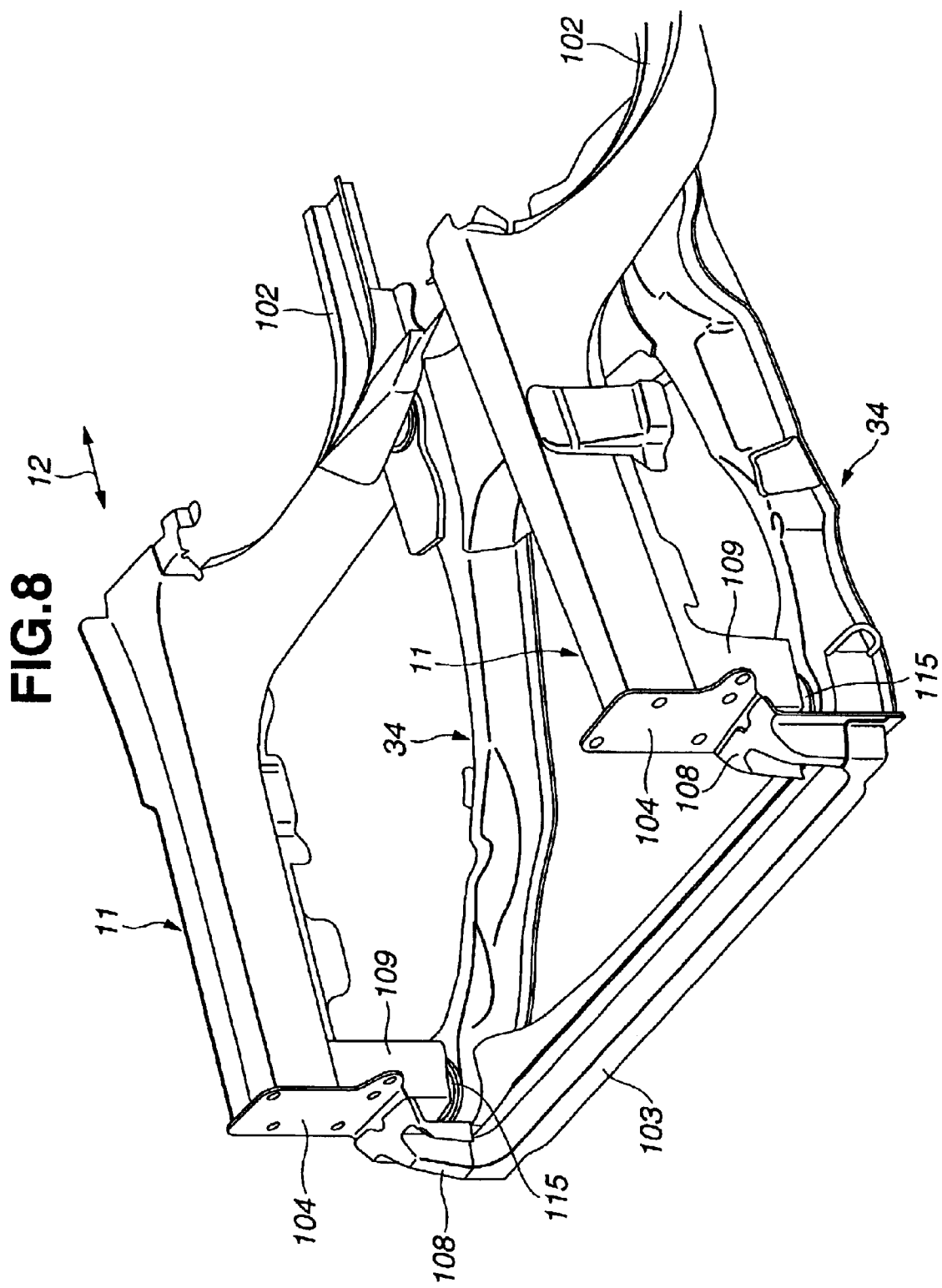
FIG. 8 is a perspective view of the front structure of a second embodiment of the present invention.

Referring to FIGS. 8–11, a second embodiment of the vehicle front structure of the invention will be explained hereinafter. The second embodiment differs in arrangement of first cross member 103 from the first embodiment using tie-down hook 38. Like reference numerals denote like parts, and therefore, detailed explanations therefor are omitted. As illustrated in FIG. 8, there is shown a body frame structure of a front compartment of a vehicle. A rear end portion of each front side member 11 is joined with extension side member 102 which rearward extends from a dashboard along a lower side surface of a floor of the vehicle. Front end portions of left and right front side members 11 are connected with first cross member 103 as a lateral frame member extending in the lateral direction perpendicular to fore-and-aft direction 12 of the vehicle. Subframes 34 extending along and below front side members 11 support a unit component, not shown, such as a power unit and a suspension unit. Rear end portions of subframes 34 are fixed to lower side surfaces of extension side members 102 or any other floor frame member.

Figure 9:
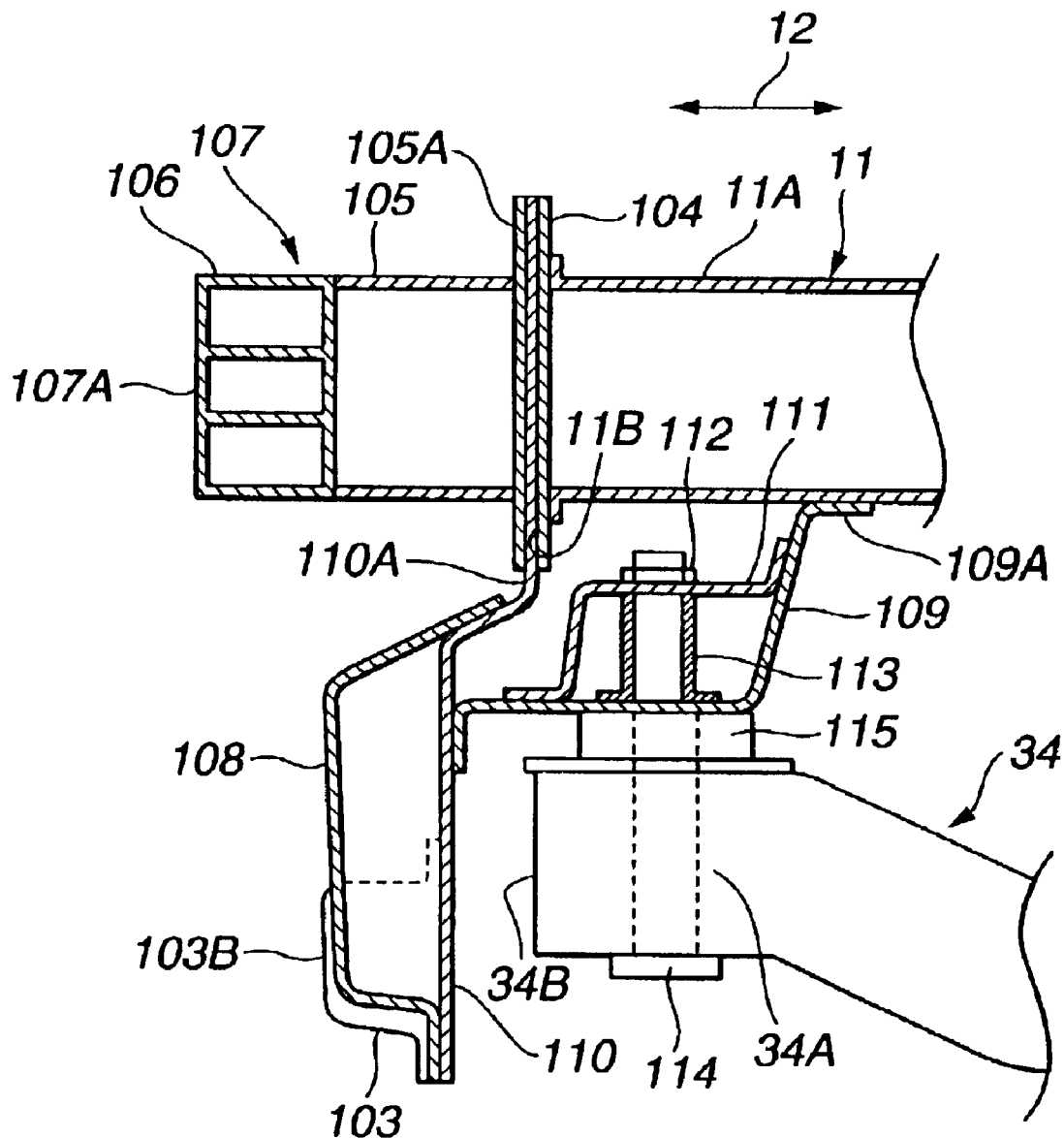
FIG. 9 is a vertical cross-section, taken in the fore-and-aft direction of the vehicle, showing an essential part of the front structure of the second embodiment.

As illustrated in FIG. 9, bumper member 107 is connected with front end portion 11A of each front side member 11 via closing plate 104. Bumper member 107 includes box-shaped bumper stays 105 fixed to closing plates 104 by means of bolts and nuts, not shown. Bumper stays 105 are in coaxial alignment with left and right front end portions 11A of front side members 11. Bumper reinforcement 106 extending in the lateral direction of the vehicle is connected with bumper stays 105. Bumper stays 105 and bumper reinforcement 106 have a rigidity less than that of front side members 11. Namely, bumper stays 105 and bumper reinforcement 106 are so designed as to be deformed and collapsed at an initial stage of application of an impact load thereto to thereby absorb impact load and prevent the deformation from spreading to front side members 11.

Figure 11:
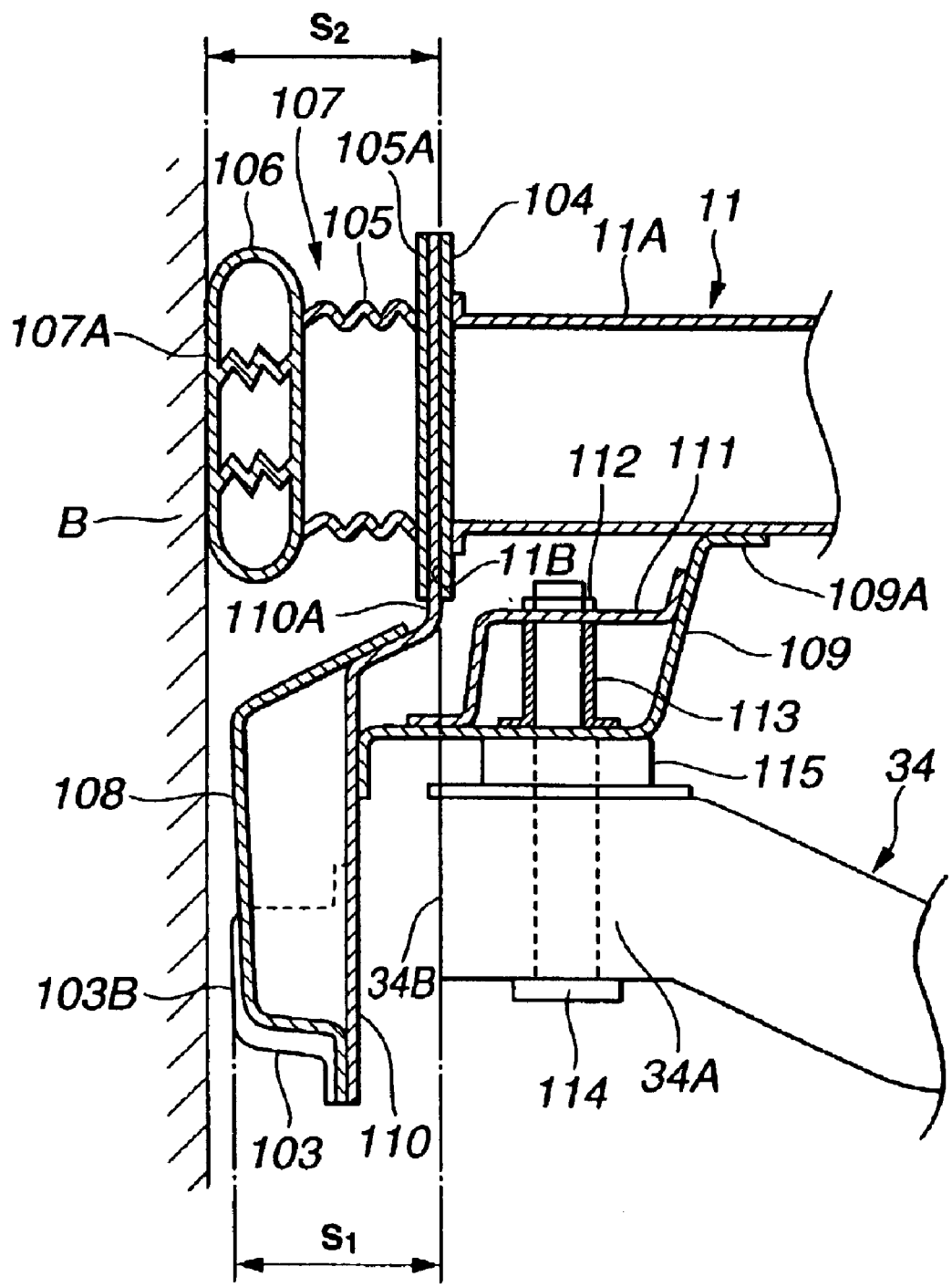
FIG. 11 is a view similar to FIG. 10, but showing a different deformation condition of the front structure of the second embodiment when undergoing the impact load.

As illustrated in FIG. 9, subframe 34 has leading end 34B substantially aligned with leading end 11B of front end portion 11A of front side member 11 in fore-and-aft direction 12 of the vehicle. First cross member 103 is placed in substantially same height of front end portion 34A of subframe 34. First cross member 103 is placed in such a position forward offset from leading end 11B of front end portion 11A of front side member 11. Specifically, front end 103B of first cross member 103 is located forward offset from leading end 11B of front end portion 11A of front side member 11. Front end 103B of first cross member 103 is also located rearward offset from front end 107A of bumper member 107. As shown in FIG. 11, forward offset $S_1$ of front end 103B of first cross member 103 is set to be less than collapsed length $S_2$ of bumper member 107, namely, length between front end 107A of bumper member 107 and leading end 11B of front side member 11, under condition that bumper member 107 undergoes first deformation upon applying a relatively small impact load to front end 107A of bumper member 107. Forward offset $S_1$ is determined to be substantially equal to collapsed length $S_2$ under condition that bumper member 107 undergoes second deformation upon applying a more impact load larger than the relatively small impact load to front end 107A of bumper member 107.

As illustrated in FIG. 9, first cross member 103 and subframe 34 are connected with front end portion 11A of front side member 11 via mounting brackets 108 and 109, respectively. Mounting bracket 108 connects each of left and right end portions of first cross member 103 with each of front end portions 11A of left and right front side members 11. Mounting bracket 109 connects each of front end portions 34A of left and right subframes 34 with each of front end portions 11A of left and right front side members 11. Mounting brackets 108 and 109 each has a box-shape having a closed cross-section. Mounting bracket 108 for first cross member 103 is located forward of mounting bracket 109 for subframe 34. Mounting brackets 108 and 109 are connected with each other via common single panel 110. Panel 110 includes a wall portion forming a rear wall of mounting bracket 108 and a front wall of mounting bracket 109, and upper bracket portion 110A upward extending from the wall portion. Upper bracket portion 110A is interposed between closing plate 104 and flange 105A of bumper stay 105 and fixed thereto by means of bolts and nuts, not shown. Mounting bracket 109 has upper peripheral flange 109A formed on upper peripheries of a rear wall and left and right side walls thereof. Upper peripheral flange 109A is fixed to an outer surface of a bottom wall of front side member 11 by means of bolts and nuts, not shown. Nut plate 111 having a generally L-shaped section shown in FIG. 9, is disposed on the inside of mounting bracket 109. Nut plate 111 with nut 112 is joined with a bottom wall of mounting bracket 109 and the rear wall thereof and cooperates therewith to form a generally rectangular-shaped section. Collar 113 is disposed between nut plate 111 and the bottom wall of mounting bracket 109 in coaxial relation to nut 112. Vibration-isolating bushing 115 is installed between an upper surface of front end portion 34A of subframe 34 and a lower surface of the bottom wall of mounting bracket 109. Bolt 114 is inserted from the lower side of front end portion 34A of subframe 34 into collar 113 and screwed into nut 112. With the arrangement of bolt 114 extending through nut plate 111, collar 113, the bottom wall of mounting bracket 109, and front end portion 34A of subframe 34, front end portion 34A of subframe 34 is supported by mounting bracket 109 with increased rigidity.

Figure 10:
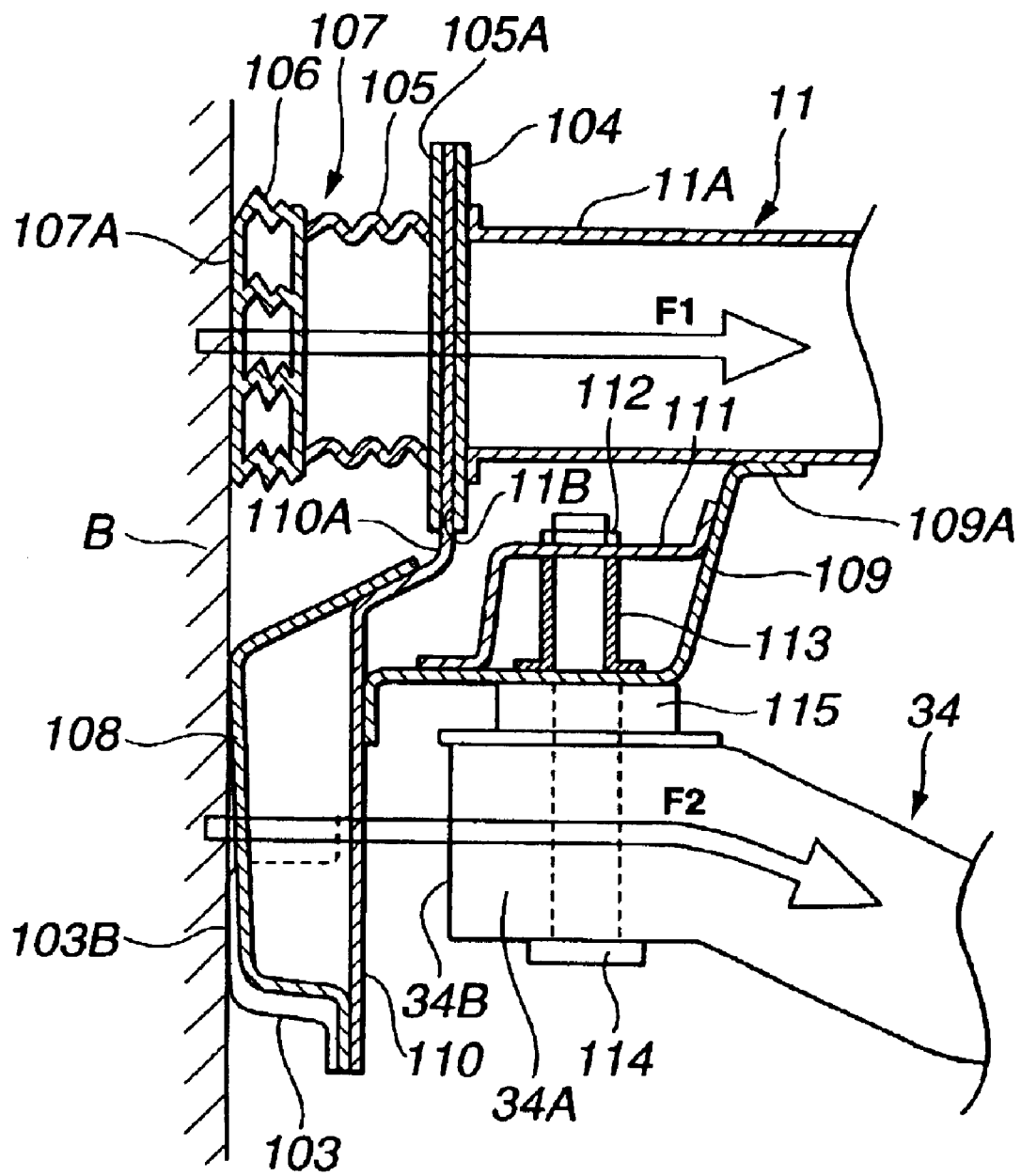
FIG. 10 is a view similar to FIG. 9, but showing a deformation condition of the front structure of the second embodiment when undergoing an impact load from the front side of the vehicle.

Referring now to FIGS. 10 and 11, an operation of the vehicle front structure of the second embodiment upon application of an impact load thereto from the front side of the vehicle is explained. FIG. 10 shows a deformation condition of the front structure when an impact load is applied to the front structure. FIG. 11 shows a deformation condition of the front structure when a relatively small impact load less than the impact load in the condition of FIG. 10 is applied to the front structure. As illustrated in FIG. 10, when the front portion of the vehicle abuts on counterpart B, the impact load is applied to front end 107A of bumper member 107. Bumper reinforcement 106 and bumper stay 105 of bumper member 107 are collapsed and deformed into corrugated states as shown in FIG. 10 due to the impact load applied. Impact force F1 is transmitted to front end portion 11A of front side member 11 via bumper member 107 in the axial direction of front side member 11. Immediately upon the deformation of bumper member 107, front end 103B of first cross member 103 abuts on counterpart B to be urged to rearward move and interfere with front end 34B of subframe 34. Impact force F2 is transmitted to subframe 34 along the axial direction of subframe 34, with the arrangement that front end 103B of first cross member 103 is forward offset from leading end 11B of front side member 11, that front end 34B of subframe 34 and leading end 11B of front side member 11 are in substantially alignment with each other in the fore-and-aft direction of the vehicle, and that first cross member 103 is placed at substantially same height as front end portion 34A of subframe 34. With the front structure of the second embodiment, a collapse reaction force in subframe 34 can be produced at the substantially same timing as in front side member 11. As a result, both of front side member 11 and subframe 34 may be deformed from relatively early stage of application of the impact load. The impact load applied to bumper member 107 can be shared by front side member 11 and subframe 34, serving for enhancing the efficiency of absorption of the impact energy.

Further, mounting bracket 108 for first cross member 103 and mounting bracket 109 for subframe 34 are formed into box shapes and arranged adjacent to each other in the fore-and-aft direction of the vehicle with interconnection as described above. Therefore, in spite of the arrangement of first cross member 103 forward offset from leading end 11B of front side member 11, sufficient rigidity of the mounting structure of first cross member 103 can be ensured.

Further, the interconnection between mounting brackets 108 and 109 in the fore-and-aft direction of the vehicle can improve transmission of the impact load from first cross member 103 to subframe 34. Furthermore, the front wall of mounting bracket 109 and the rear wall of mounting bracket 108 are formed by common single panel 110, so that mounting brackets 108 and 109 can be integrally formed in a compact size. The number of parts can be reduced, serving for cost and weight saving in manufacture of the vehicle.

On the other hand, when a less impact load is applied to the front portion of the vehicle upon front end 107A of bumper member 107 abutting on counterpart B, bumper reinforcement 106 and bumper stay 105 of bumper member 107 are deformed as illustrated in FIG. 11. In this condition, first cross member 103 is free from being contacted with counterpart B. Therefore, first cross member 103 and subframe 34 located rearward thereof can be prevented from undergoing deformation due to the less impact load. This is because forward offset $S_1$ of front end 103B of first cross member 103 relative to leading end 11B of front side member 11 is less than collapsed length $S_2$ of bumper member 107 which is determined under condition that the less impact load is applied to front end 107A of bumper member 107.

With the arrangement of first cross member 103 relative to front end portion 11A of front side member 11 and front end portion 34A of subframe 34, the impact load applied to bumper member 107 can be effectively shared by front side member 11 and subframe 34 in stages, serving for improving absorption of the impact energy.

Further, with the arrangement of front end 103B of first cross member 103 forward offset from front end 11B of front side member 11, an entire length of bumper member 107 can be reduced. This can reduce an amount of front overhang of the front compartment of the vehicle which forward projects from front wheels, serving for enhancing freedom of design of the front compartment.

This application is based on prior Japanese Patent Applications No. 2001-232462 filed on Jul. 31, 2001 and No. 2001-357698 filed on Nov. 22, 2001, the entire contents of which are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A front structure for a vehicle, the front structure comprising:
   a pair of front side members extending in a fore-and-aft direction of the vehicle and including a first front end portion;
   a pair of subframes extending along the front side members on a lower side thereof, said pair of subframes each including a second front end portion connected with said first front end portion at a connecting portion therebetween; and
   a tie-down hook disposed on the connecting portion between said first front end portion and said second front end portion, said tie-down hook including a lower portion positioned at substantially same height as said second front end portion.

2. The front structure as claimed in claim 1, wherein said tie-down hook comprises an upper portion connected with the front side member, said upper portion being placed in a position rear-ward offset from a leading end of said first front end portion.

3. The front structure as claimed in claim 1, further comprising a bumper member extending perpendicular to the fore-and-aft direction of the vehicle, said bumper member being connected with said first front end portion and having a front end, said lower portion of said tie-down hook comprising a forward projection located in a position forward offset from a leading end of said first front end portion and rearward offset from said front end of said bumper member.

4. The front structure as claimed in claim 1, further comprising a front suspension mounting portion disposed at the connecting portion between said first and second front end portions.

5. The front structure as claimed in claim 4, further comprising a front suspension mounting bolt fixed to said front suspension mounting portion, said front suspension mounting bolt being disposed adjacent to said tie-down hook.

6. A front structure for a vehicle, the front structure comprising:
   a pair of front side members extending in a fore-and-aft direction of the vehicle, said pair of front side members each including a first front end portion with a first leading end;
   a pair of subframes extending along the front side members on a lower side thereof, said pair of subframes each including a second front end portion with a second leading end, said second front end portion being connected with said first front end portion via a connecting portion therebetween; and
   an abutment member connected with the subframes via the connecting portion between said first and second front end portions, said abutment member including a front end forward offset from said first and second leading ends, and a portion placed at substantially same height as said second front end portion.

7. The front structure as claimed in claim 6, wherein said abutment member is a tie-down hook for holding a tow rope, said front end being a forward projection, said portion of the abutment member which is placed at substantially a same height as said front end portion being a lower portion of said tie-down hook.

8. The front structure as claimed in claim 7, wherein said tie-down hook comprises an upper portion connected with the front side member, said upper portion being placed in a position rearward offset from said first leading end.

9. The front structure as claimed in claim 7, further comprising a bumper member extending perpendicular to the fore-and-aft direction of the vehicle, said bumper member being connected with the first leading ends of the front side members, said bumper member including a second front end forward offset from the forward projection of the tie-down hook.

10. The front structure as claimed in claim 7, further comprising a front suspension mounting bracket disposed at the connecting portion between said first and second front end portions.

11. The front structure as claimed in claim 10, further comprising a front suspension mounting bolt fixed to said front suspension mounting bracket, said front suspension mounting bolt being spaced from said tie-down hook in a lateral direction perpendicular to the fore-and-aft direction of the vehicle.

12. The front structure as claimed in claim 6, wherein said abutment member is a first cross member extending in a lateral direction perpendicular to the fore-and-aft direction of the vehicle.

13. The front structure as claimed in claim 12, wherein said second leading end is substantially aligned with said first leading end in the fore-and-aft direction of the vehicle.

14. The front structure as claimed in claim 12, further comprising a bumper member extending perpendicular to the fore-and-aft direction of the vehicle, said bumper member being connected with the first leading ends of the front side members, said bumper member including a second front end forward offset from the first front end of the first cross member.

15. The front structure as claimed in claim 12, further comprising a first mounting bracket connecting said second front end portion with said first front end portion, and a second mounting bracket connecting a lateral end portion of the first cross member with said first front end portion, said second mounting bracket being offset forward from said first mounting bracket and joined therewith, said first and second mounting brackets each having a box-shaped closed cross-section.

16. The front structure as claimed in claim 15, wherein said first mounting bracket comprises a front wall, said second mounting bracket comprising a rear wall, said front wall and said rear wall being formed by a common plate.

17. The front structure as claimed in claim 14, wherein the forward offset of the front end of the first cross member is set to be less than a collapsed length between the front end of the bumper member and the first leading end of the front side member under condition that the bumper member undergoes first deformation upon applying a first impact load to the front end of the bumper member, said forward offset being substantially equal to the collapsed length under condition that the bumper member undergoes second deformation upon applying a second impact load, larger than the first impact load, to the front end of the bumper member.

* * * * *